United States Patent [19]

Werber

[11] 4,209,604
[45] Jun. 24, 1980

[54] ANAEROBIC MONOMERS AND ADHESIVES

[75] Inventor: Gerhardt P. Werber, Naperville, Ill.

[73] Assignee: Estech Specialty Chemicals Corporation, Chicago, Ill.

[21] Appl. No.: 647,217

[22] Filed: Jan. 7, 1976

[51] Int. Cl.² ............ C08F 24/00; C08F 224/00; C08F 2/00; C08F 120/00
[52] U.S. Cl. .................... 526/270; 548/309; 548/310; 260/348.44; 548/312; 548/313; 260/348.54; 560/120; 560/125; 526/204; 560/127; 560/155; 526/206; 560/172; 560/199; 526/217; 560/205; 560/219; 526/260; 560/220; 560/221; 526/273; 560/222; 560/224; 526/286; 560/225; 526/288; 526/292; 526/312; 526/313; 526/315; 526/320; 526/205
[58] Field of Search ........... 260/485 G, 475 P, 468 K, 260/73 R, 348.44, 348.54; 526/320, 292, 312, 315, 260, 286, 288, 270, 273; 560/199, 120, 127, 125, 172, 155, 205, 219, 220, 221, 222, 224, 225; 548/309, 310, 312, 313

[56] References Cited

U.S. PATENT DOCUMENTS

| | | | |
|---|---|---|---|
| 3,221,043 | 11/1965 | Fekete et al. | 260/485 G |
| 3,367,992 | 2/1968 | Bearden | 260/485 G |
| 3,457,212 | 7/1969 | Fukuoka | 260/31.4 |
| 3,471,386 | 10/1969 | D'Alelio | 260/485 G |
| 3,485,732 | 12/1969 | D'Alelio | 260/485 G |
| 3,485,733 | 12/1969 | D'Alelio | 260/485 G |
| 3,754,054 | 8/1973 | Kimura et al. | 526/320 |
| 3,808,226 | 4/1974 | Habermeier et al. | 548/309 |
| 3,852,302 | 12/1974 | Habermeier et al. | 548/312 |
| 3,880,956 | 4/1975 | Skoultchi | 260/42.21 |
| 3,894,016 | 7/1975 | Habermeier et al. | 548/312 |
| 3,910,992 | 10/1975 | Skillicorn | 526/320 |
| 3,923,737 | 12/1975 | George et al. | 260/47 UA |
| 3,925,322 | 12/1975 | Azuma et al. | 260/75 UA |

*Primary Examiner*—Joseph L. Schofen
*Assistant Examiner*—Herbert J. Lilling
*Attorney, Agent, or Firm*—Jay C. Langston; W. C. Davis

[57] ABSTRACT

Polymerizable acrylic monomers, and anaerobic adhesives which contain such monomers, wherein the acrylic monomers contain internal chain unsaturation in addition to terminal acrylic unsaturation.

6 Claims, No Drawings

ANAEROBIC MONOMERS AND ADHESIVES

This invention relates to polymerizable acrylic monomers and to adhesives containing such monomers. More particularly, this invention relates to acrylic monomers and adhesives containing same which anaerobically polymerize, that is, cure in the absence of air.

The inhibiting effect of oxygen to the cure of acrylic monomers has been known for many years. This apparently adverse condition was transformed into something potentially valuable by the invention in U.S. Pat. No. 2,628,178 wherein a highly reactive monomer was prepared by bubbling air through a heated and agitated polyether glycol dimethacrylate ester, so as to form peroxides in the monomer chain. The oxygenated ester monomer remained liquid as long as aeration continued, but polymerized to a solid when aeration was discontinued. Unfortunately, this system had little commercial value due to the inherent problems of keeping the monomer fluid by aeration. Thereafter, in U.S. Pat. No. 2,895,950, a chemical solution to the problem of keeping the dimethacrylate monomer from solidifying without aeration was set forth. It was disclosed that, by adding a hydroperoxide, the dimethacrylate ester could be cured (polymerized) at room temperature by placing the mixture between steel plates. On the other hand, when stored in a glass or plastic container, sufficient oxygen from the air in the head space diffused into the acrylic liquid, and kept it from polymerizing.

Since certain metal ions act as catalysts in decomposing the hydroperoxides, enabling commercially feasible cure times, most of the market for anaerobic adhesives has developed in bonding metal to metal. For example, anaerobic adhesives are used as (1) thread locking compounds which prevent loosening caused by vibration, (2) sealing compounds for threaded, flanged and sleeved joints to retain fluids and prevent leaking, (3) retaining compounds to bond parts having cylindrical symmetry such as gears or pulleys onto shafts, and (4) bonding compounds which serve as structural adhesives.

Generally, depending upon the ultimate use of the anaerobic adhesive, these adhesives should have high shear strength, good hot strength, and fast cure speed. Unfortunately, prior art anaerobic monomers, and mixtures thereof, tend to exhibit some of these important characteristics, but not all simultaneously. For example, prior art monoacrylate monomers, such as hydroxyethyl methacrylate, cure quite rapidly yielding an adhesive exhibiting excellent shear strength, but relatively poor hot strength. Furthermore, prior art polyacrylate monomers, containing two or more acrylate groups, such as ethylene glycol dimethacrylate or trimethylolpropane trimethacrylate, exhibit good hot strength, but relatively poor shear strength. Also, several recent Japanese patents disclose anaerobically curing acrylic monomers prepared by the reaction of phthalic anhydride with mono or diacrylates. See Japanese Pat. Nos. 73/89,947, 73/9460 and 71/31,680. These monomers, however, do not simultaneously exhibit excellent shear strength and hot strength.

In view of the foregoing, there is a continuing need in the anaerobic adhesive art for improved monomers and adhesive systems. Accordingly, it is a principal object of the present invention to provide improved polymerizable monomers for use in anaerobic adhesive systems.

It is also an object of the present invention to provide improved acrylic monomers which, when cured, simultaneously exhibit high shear strength and good hot strength.

It is an additional object of the present invention to provide improved anaerobic adhesives which exhibit good cure speed, high shear strength, and good hot strength.

It is another object of the present invention to provide novel monoacrylate and polyacrylate monomers containing internal chain unsaturation in addition to terminal acrylic unsaturation.

As used in the present description and discussion of this invention, "acrylic" shall refer to the group

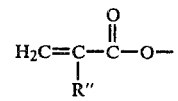

wherein R" is a member selected from the group consisting of hydrogen, chlorine, methyl and ethyl radicals. "Monoacrylate monomer" shall refer to a monomer having a terminal acrylic group, and "polyacrylate monomer" to a monomer having two or more acrylic groups. For ease of discussion, "acrylic monomers" shall be used to refer to both monoacrylate and polyacrylate monomers.

The objectives of this invention are carried out by providing polymerizable monoacrylates and polyacrylates which contain one or more olefinically unsaturated polycarboxylic acid residues. The unsaturated carbon-carbon double bonds introduced by the polycarboxylic acid groups enable cross-linking of the monomers during curing, so as to provide a cured polymer having exceptional hot strength, as well as excellent shear strength.

The improved monoacrylate monomers of this invention comprise the reaction product of (a) a monoacrylate monomer having a reactive site capable of reacting with a carboxyl group and (b) an unsaturated polycarboxylic acid or unsaturated polycarboxylic acid anhydride. The reactive site of the monoacrylate reactant is selected from the group consisting of hydroxyl (—OH), primary amine (—NH$_2$) and secondary amine (—NR'H) groups wherein R' is a benzyl radical or an alkyl group of from 1 to 4 carbon atoms, e.g., methyl, ethyl, propyl, butyl radicals. Although the reactive site is most often a terminal reactive site, the invention includes those monoacrylate reactants having an internal reactive site. Typical monoacrylate monomer reactants which may be used include hydroxyethyl acrylate, hydroxyethyl methacrylate, hydroxypropyl acrylate, hydroxypropyl methacrylate, aminoethyl methacrylate, aminopropyl methacrylate, aminoethyl acrylate, aminopropyl acrylate, N-methyl aminoethylene methacrylate and N-benzyl methyl methacrylate. Also, acrylate reactants having a suitable reactive site as defined above can be prepared by reacting acrylic acid or methacrylic acid with epichlorohydrin, glycidol, styrene oxide, phenyl glycidyl ether, butyl glycidyl ether, allyl glycidyl ether, or glycidyl methacrylate.

The other reactant is an unsaturated polycarboxylic acid or an unsaturated polycarboxylic acid anhydride. Typical unsaturated dicarboxylic acids include maleic, fumaric, itaconic and its isomers, allylmalonic and its isomers, allylsuccinic and its isomers, xeronic acids and cetylmalonic acids. Because reaction with the acid anhydride proceeds much easier than reaction with the carboxylic acid, and because no byproducts are formed, it is generally preferred to use the unsaturated acid anhydride. Therefore, this invention will be discussed in terms of reaction with the unsaturated acid anhydride. Although all unsaturated polycarboxylic acid anhydrides are envisioned within the scope of this invention, the unsaturated dicarboxylic acid anhydrides, in particular, comprise the most important reactants. Typical unsaturated acid anhydrides which may be utilized in the present reaction include maleic anhydride, itaconic anhydride, tetrahydrophthalic anhydride, as well as the Diels-Alder reaction product of maleic anhydride and cyclopentadiene, and the Diels-Alder reaction product of maleic anhydride and methyl-substituted cyclopentadiene. It should be noted that the Diels-Alder anhydrides mentioned here are bicyclic, containing 2 carbocyclic rings, one having 6 carbon atoms and the other 5 carbon atoms.

Reaction of the monoacrylate monomer, having the above-defined reactive site, with the unsaturated polycarboxylic acid anhydride, results in cleavage of the anhydride linkage, and formation of a compound having a terminal acrylic group, a terminal carboxylic acid group, and an internal olefinic carbon-carbon double bond contributed by the unsaturated polycarboxylic acid residue.

The reaction between the anhydride and the acrylate is carried out at a temperature of from about 25° C. up to about 90° C. The reaction may be carried out with or without the presence of a tertiary amine catalyst such as triethylamine. Generally, the reaction mixture should be agitated and/or aerated in order to promote the reaction. Although the mole ratio of reactants is not critical, and may be carried out in stoichiometric amounts or with an excess of either, it has been discovered that the reaction is preferably carried out when one mole of the acid anhydride is used for about every 1.0 to 1.2 moles acrylate reactant. Generally, the reaction proceeds to completion within a period of from about 1 to 4 hours when reacted in the presence of a catalyst and when heated above room temperature.

This new monoacrylate monomer remains liquid in the presence of air or oxygen, but is polymerizable via catalysis to a solid in the absence of air. It has been discovered that this new monomer, when incorporated in an anaerobic adhesive system, results in a cured polymer which simultaneously exhibits good shear strength and hot strength. Thus, this new monomer lends itself to improved anaerobic adhesive systems as herein later described.

The reaction and novel monomer may be expressed as follows:

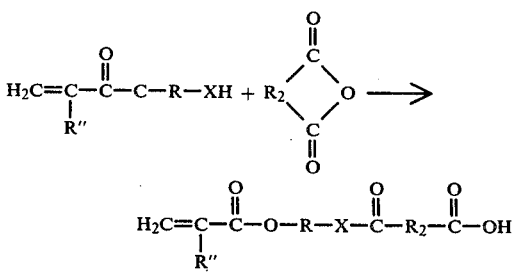

wherein R″ is as previously defined; R is

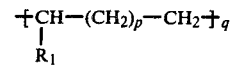

where $R_1$ is a member selected from the group consisting of hydrogen, methyl, ethyl, chloromethyl, methylol, phenyl, methoxyphenyl, methoxybutyl and methoxyallyl radicals or

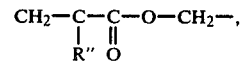

p is an integer of from 0 to 2, q is an integer of from 1 to 3; $R_2$ is an unsaturated divalent alkyl or substituted alkyl group of from 2–4 carbon atoms or an unsaturated divalent carbocyclic aliphatic ring of from 4 to 9 carbon atoms, and preferably 5 or 6 carbon atoms; and X is a member selected from the group consisting of —O—, —NH—, or —NR′— where R″ is as previously defined.

This novel monoacrylate monomer can undergo chain extending reactions through the terminal carboxyl group by reaction with epoxides or glycidyl ethers or polyols to form ester linkages. Typical chain extending reactants include ethylene oxide, ethylene glycol, propylene oxide, propylene glycol and phenyl glycidyl ether. For example, when the novel monoacrylate monomer (I) is represented as

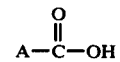

then a chain extending reaction between this monomer and an epoxide or glycidyl ether may be represented as follows:

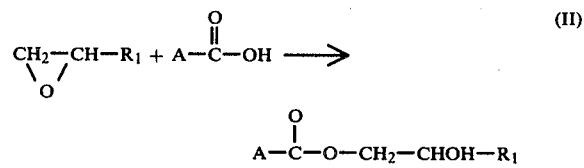

wherein $R_1$ is as previously defined.

The reactive hydroxyl group formed during the esterification of the carboxyl group with the epoxide or polyol can then undergo esterification with another carboxyl group, supplied by additional carboxyl terminated monoacrylate monomer (I) or by another organic carboxylic acid or anhydride. Thus, suitable carboxylic acid anhydrides include phthalic anhydride and its isomers, pyromellitic dianhydride and benzophenone tetracarboxylic acid dianhydride, as well as the unsaturated dicarboxylic acid anhydrides previously described. Although monomer (I) can first be reacted with a polyol or epoxide as described above, and then reacted with additional carboxylic acid or acid anhydride, it is preferably to react the monomer (I), the polyol or epoxide, and the carboxylic acid or anhydride simultaneously. The reaction product is a novel acrylic monomer defined by the following structure:

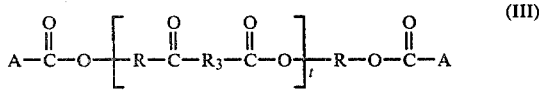 (III)

wherein A and R are as previously defined; t is an integer of from 0 to 20; and $R_3$ is a divalent radical selected from the group consisting of $R_2$ as previously defined, phenyl, butyl, di-carboxylic acid substituted phenyl and hexane carboxylate, cyclopentadiene diepoxide, dicyclopentadiene diepoxide and hydantoin-based diepoxides. However, the preferred diepoxides are the bisphenol diepoxides represented by $R_5$—O—Ph—C $(R_6)_2$—Ph—O—$R_5$ where $R_5$ is an alkyl epoxide of from 2-5 carbon atoms, Ph is phenyl and $R_6$ is hydrogen, methyl, ethyl, propyl or butyl. Thus, monoacrylate monomer (I) can be reacted with 2,2-bis 4-(2',3" epoxy propoxy) phenyl propane the diglycidyl ether of bisphenol-A) as follows:

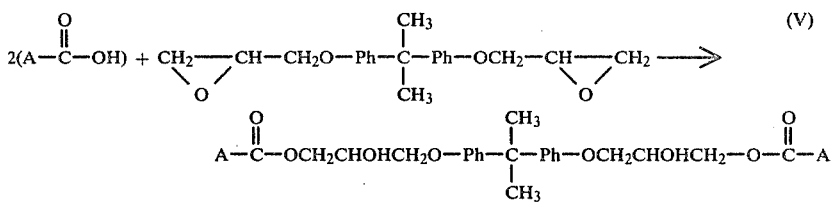 (V)

where A is as previously defined.

The reaction of monomer (I) with polyepoxides or diepoxides to obtain the novel class of diacrylate monomers (IV) and (V) is generally carried out under agitation and/or aeration at from about room temperature up to about 100° C. for greater than about 4 hours. A tertiary amine catalyst, such as triethylamine, may be employed if desired. Although not critical, approximately stoichiometric amounts of the reactants are generally used. It should also be understood that novel monomers (IV) and (V) can be prepared by simultaneous reaction of the anhydride, the monoacrylate having a reactive site, and the polyepoxide or diepoxide. The diacrylate monomers (IV) and (V) remain liquid in the presence of air but will polymerize in an anaerobic adhesive system in the absence of air to yield a polymer having exceptional shear strength and hot strength.

In addition to the above-described chain extending reaction of acrylic monomer (I) with epoxides, polyols or glycidyl ethers to yield additional acrylic monomers such as monomers (II)–(V), acrylic monomer (I) may also be reacted through its terminal carboxyl group with metal oxides or hydroxides, with ammonia, with amines or imines, with alcohols, and with guanidine carbonate. Thus, the oxides or hydroxides of metals such as zinc, calcium, magnesium, sodium and potassium can be reacted with monoacrylate monomer (I) to yield the corresponding metal salt (alkoxide). Also, ammonia will react with the monoacrylate to yield the ammonia salt. Additionally, aliphatic primary or secondary amines and imines can be reacted with the monoacrylate monomer to yield amine salts, which salts can be converted to amides by heating. Alcohols react with the monomer to yield corresponding esters. Guanidine carbonate will react with the monomer to yield the guanidine salt thereof.

COOH—Ph—C—Ph—COOH
         |  ||  |
            O where Ph is phenyl.

One example of such a reaction is the reaction between monomer (I), ethylene glycol and phthalic anhydride:

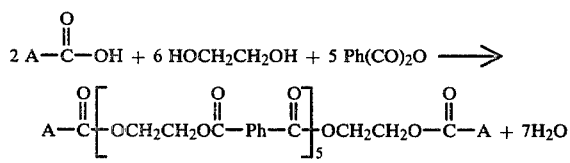

A particularly valuable reaction of monoacrylate monomer (I), similar to the chain extending reactions previously described, is the reaction with polyepoxides, especially diepoxides, to form novel polyacrylate and diacrylate monomers having two or more internal carbon-carbon double bonds available for subsequent cross polymerization. This reaction may be defined as:

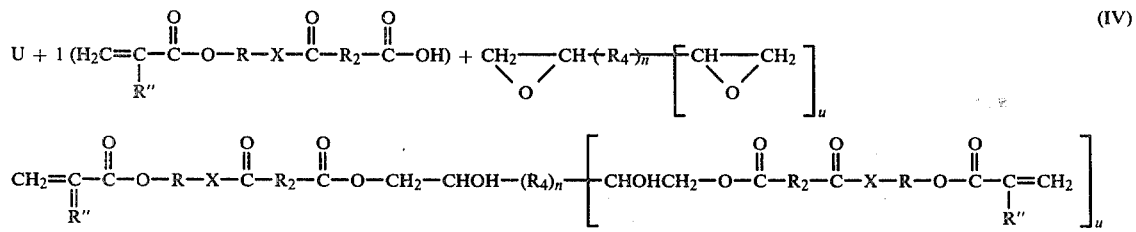 (IV)

where R", R and $R_2$ are as previously defined; $R_4$ is a member selected from the group consisting of alkyl of 1–4 carbon atoms, alkoxy (oxy alkyl) of 2–4 carbon atoms, alkylidene oxy aryl (oxy alkylidene aryl), methylol alkoxy aryl, cyclohexadiene dioxide, cyclopentadiene dioxide, alkoxy hydantoin and alkoxy aryl sulfone; n is 0 or 1; and u is an integer of from 1 to 5.

Suitable polyepoxides that can be reacted with monomer I include the novolac resins (phenol-formaldehyde epoxides) as described in U.S. Pat. No. 3,301,743. Typical diepoxides that may be utilized include limonene dioxide, 1,4 cyclohexadiene dioxide, 3,4-epoxy-6-methyl cyclohexyl methyl 3,4-epoxy 6-methyl cyclo- Like prior art acrylic monomers, the novel acrylic monomers of this invention are capable of free-radical initiated addition polymerization at the unsaturated acrylic double bonds in the absence of air. This addition polymerization, in the absence of air, is catalyzed by free-radical initiators such as peroxides and hydroperoxides, and in particular, thermally stable organic hydroperoxides such as tertiary butyl hydroperoxide and cumene hydroperoxide. Other hydroperoxides which are less stable but more reactive can also be used. The catalyst is generally included in the anaerobic adhesive composition in an amount of from about 0.01 to 10% by weight of the total adhesive composition, and preferably from about 0.5 to 5.0% by weight. The catalyst is generally ineffective to polymerize the monomer in the presence of oxygen, but will initiate addition polymerization when air is excluded.

Also, in accordance with established prior art procedures, polymerization of the present monomers can be accelerated by incorporating promoters in the anaerobic adhesive composition. These promoters are tertiary organic amines, imides, sulfimides or mixtures thereof, such as dimethyl aniline, dimethyl-p-toluidine and benzoic sulfimide. The promoters are incorporated in the adhesive composition in amounts of from about 0.01 to 10% by weight, and preferably from about 1 to 10% by weight of the adhesive composition.

As is known in the art, anaerobic adhesives should be stabilized in order to prevent accidental polymerization induced by the presence of impurities that tend to catalyze polymerization of the acrylic monomer even in the presence of air. The addition of inhibitors such as quinones, e.g., benzoquinone, greatly prolongs the shelf-life of the adhesives. These inhibitors need be present in the adhesive composition in only very small amounts, usually from about 10 to 1000 parts per million (ppm), and preferably from about 50 to 300 ppm.

Many optional ingredients may be incorporated in the final adhesive formulation, depending on the properties desired. For example, a plasticizer may be added in amounts of up to 50% by weight of the composition as needed. Also, a viscosity control agent, such as fumed silica, may be added, usually in amounts of less than about 5%. Further, lubricants and dyes may be added, if desired.

It should also be understood that the anaerobic adhesive compositions of this invention may include prior art acrylic monomers blended with the novel acrylic monomers described herein (monomers I-V). Thus, the present novel acrylic monomers may be blended with hydroxyethyl methacrylate, hydroxy propyl methacrylate, trimethylolpropane trimethacrylate, dibromo propyl methacrylate, diethylene glycol dimethacryate, triethylene glycol dimethacrylate, dimethyl amino ethyl methacrylate, tetraethylene glycol dimethacrylate, di-propylene glycol dimethacrylate, methyl methacrylate, ethyl methacrylate, propyl methacrylate, polyethylene glycol dimethacrylate, di-(pentamethylene glycol) dimethacrylate, n-butyl methacrylate, trimethylolpropane triacrylate, tetraethylene glycol diacrylate, isobutyl methacrylate, tetraethylene glycol di-(chloroacrylate), diglycerol diacrylate, diglycerol tetramethacrylate, butylene glycol dimethacrylate, ethylene glycol dimethacrylate, neopentyl glycol diacrylate, and tetrahydrofurfural methacrylate. It will be clear to those in the art that the above is only a partial list of available polymerizable acrylic monomers, and that all such known polymerizable acrylic monomers may be beneficially blended with the novel acrylic monomers (I-V) to form improved anaerobic adhesive systems.

As has been previously discussed, acrylic monomers (I-V) contain internal chain unsaturation provided by the residue of the unsaturated polycarboxylic acid or anhydride. Polymerization of these monomers in the absence of air (curing) is achieved by addition polymerization through the acrylic unsaturation. However, unlike prior art anaerobic adhesive systems, monomers (I-V) contain non-acrylic internal chain unsaturation and are thus capable of cross-polymerization through these internal olefinic unsaturated sites. The resulting cross-polymerized adhesive exhibits exceptional hot strength, as well as good shear strength. Additionally, it is believed that only a portion of the anhydride residue unsaturation is cross-polymerized during normal curing, and that a substantial amount of anhydride residue unsaturation remains for subsequent cross-polymerization during application of heat. This is extremely important where the anaerobic adhesive is to be used in an application where it will be subjected to heat. In such a situation, additional cross-polymerization occurs, thus further improving the hot strength of the polymer.

In the foregoing description of this invention many references have been made to shear strength and hot strength. In the following examples mention will be made of breakaway strength and prevailing strength. Breakaway strength is the torque required to begin initial movement of a bolt relative to a nut which have been sealed by the curing of an anaerobic adhesive. The breakaway strength may be measured at room temperature or at various elevated temperatures. For purposes of this description, breakaway strength at room temperature shall be equated to shear strength. Typical prior art anaerobic adhesives exhibit break strengths of from about 50 inch-lbs. up to in excess of about 300 inch-lbs.

Prevailing strength is the average torque required to rotate a bolt relative to a nut through a rotation of 360° after initial breakaway. This torque may be measured by taking torque measurements at 90°, 180°, 270° and 360°, then dividing by 4. Another means of determining this prevail torque is to measure the torque required for a rotation of 180°. The prevailing strength may be measured at room temperature or at various elevated temperatures. For purposes of the present description, hot strength shall be equated to the prevailing torque at a given elevated temperature. Typical prevailing torques measured at room temperature range from about 20 inch-lbs. up to a maximum of about 500 inch-lbs. Typical prior art prevailing torques measured after 2 hours at 300° F. range up to a maximum of about 130 inch-lbs.

The invention will be described further in connection with the examples set forth below which are for purposes of illustration only.

EXAMPLE I

An acrylic monomer representative of monomers (I) was prepared by reacting an unsaturated carboxylic acid anhydride with hydroxy ethyl methacrylate. Forty-nine grams (0.5 mols) maleic anhydride were combined with seventy-eight grams (0.6 mols) hydroxy ethyl methacrylate in a 4-neck round bottom flask equipped with a condenser, agitator, thermometer and bubbler tube. Agitation was started and 5 ml. of triethylamine was added. The contents were heated at 80°–90° C. for 4 hours with agitation and aeration, then cooled to room temperature.

EXAMPLE II

The shear strength and hot strength of the monoacrylate monomer prepared in Example I was compared with that of a prior art monoacrylate monomer prepared by the reaction of phthalic anhydride with hydroxy ethyl methacrylate. Both the maleic-derived monomer and phthalic-derived monomer were formulated with identical curing and stabilizing systems to provide, respectively, anaerobic adhesive systems A and B. The adhesive compositions were placed between the mating threads of cleaned ⅜ inch diameter plain steel fasteners (16 threads per inch), and allowed to cure 9 days at room temperature. Torque measurements in inch-lbs. were taken at room temperature, after holding at 120° C. for 2 hours, and after holding at 205° C. for 2 hours then cooling to 120° C. The following results were observed:

|  | Adhesive A | | Prior Art Adhesive B | |
| --- | --- | --- | --- | --- |
|  | Breakaway Torque | Prevailing Torque | Breakaway Torque | Prevailing Torque |
| Room Temp. | 340 | 228 | 344 | 360 + |
| 120° C. | 60 | 32 | 15 | 12 |
| 120° C. after preconditioning at 205° C. | 82 | 200 | 43 | 110 |

+ means bolt sheared

The results show that both adhesive systems exhibit good shear strength (breakaway torque at room temperature), but that the maleic-derived monomer system A exhibits a tremendously improved hot strength (prevailing torque at elevated temperatures).

EXAMPLE III

In order to demonstrate that such improved hot strength can be imparted to acrylate monomer blends, 55 parts by weight of the monomer of Example I was blended with 45 parts by weight hydroxy ethyl methacrylate. Also, 55 parts of the phthalic-derived monomer of Example II was blended with 45 parts hydroxy ethyl methacrylate. Both of these blends were formulated with identical curing and stabilizing systems, providing anaerobic adhesive compositions C and D respectively. The adhesive compositions were placed between the mating threads of cleaned ⅜ inch plain steel fasteners and allowed to cure at room temperature for 7 days. Torque measurements in inch-lbs. were then taken at room temperature and after 2 hours at 120° C. with the following results:

|  | Adhesive C | | Prior Art Adhesive D | |
| --- | --- | --- | --- | --- |
|  | Breakaway Torque | Prevailing Torque | Breakaway Torque | Prevailing Torque |
| Room Temp. | 316 | 360 + | 300 | 360 + |
| 120° C. | 92 | 48 | 30 | 40 |

EXAMPLE IV

As a further example of monomer type I, one mol (86 g) methacrylic acid was reacted with 1.05 mol (157.5 g) phenyl glycidyl ether in a four neck, round bottom flask equipped with a condenser, agitator, thermometer and bubbler tube. Ten ml triethylamine was added as a catalyst and the contents heated and agitated with aeration at 60°–80° C. for 5 hours and 40 minutes. The contents of the flask were cooled and 81.7 g (0.83 mol) maleic anhydride added. An additional 10 ml triethylamine was added, and the contents heated to 100° C. with agitation for 1 hour.

Fifty parts by weight of this monomer were blended with fifty parts hydroxyethyl methacrylate and then formulated with a stabilizing and curing system to provide an anerobic adhesive composition. This adhesive was placed between the mating threads of cleaned ⅜ inch plain steel fasteners and allowed to cure for 7 days at room temperature. Torque measurements in inch-lbs. were taken first at room temperature, then after 2 hours at 120° C., and then after 20 hours at 120° C. The following data was obtained:

|  | Breakaway Torque | Prevailing Torque |
| --- | --- | --- |
| Room Temp. | 336 | 192 |
| 120° C. after 2 hrs. | 53 | 32 |
| 120° C. after 20 hrs. | 125 | 70 |

EXAMPLE V

An acrylic monomer representative of monomers (IV) and (V) was prepared by reacting 48 grams (0.49 mols) maleic anhydride with 80 grams (0.62 mols) hydroxy ethyl methacrylate and 89.2 grams (0.51 mol equivalents) of the diglycidyl ether of bisphenol-A. The reactants were combined in a flask reactor as described in Example I, then heated and agitated with aeration to 67° C. Eight ml. of triethylamine catalyst was added, and the reaction mixture maintained at 80°–90° C. for 10-½ hours until an acid value of 13 was obtained.

EXAMPLE VI

In order to demonstrate the improved hot strength imparted to an anaerobic adhesive system by the monomer of Example V, 50 parts by weight of the monomer of Example V was blended with 50 parts by weight of a well-known anaerobic adhesive monomer, hydroxy ethyl methacrylate, and then formulated with a suitable curing and stabilizing system to provide adhesive system E. This adhesive was compared with an anaerobic adhesive containing the identical curing and stabilizing system, but having only hydroxy ethyl methacrylate as the polymerizable monomer ingredient (adhesive F). The adhesive compositions were placed between the mating threads of cleaned 3/8 inch plain steel fasteners and allowed to cure 24 hours at room temperature. Torque measurements in inch-lbs. were taken first at room temperature and then after holding at 120° C. for 16 hours. The following data was obtained:

|  | Adhesive E | | Prior Art Adhesive F | |
| --- | --- | --- | --- | --- |
|  | Breakaway Torque | Prevailing Torque | Breakaway Torque | Prevailing Torque |
| Room Temp. | 300 | 360 + | 300 | 360 + |
| 120° C. | 164 | 160 | 104 | 64 |

These results establish that, while both novel monomer adhesive system E and prior art system F exhibit good shear strength, the novel monomer of Example IV imparts a surprisingly increased hot strength to adhesive system E.

Obviously, many modifications and variations of the invention as hereinbefore set forth may be made without departing from the spirit and scope thereof, and therefore, only such limitations should be imposed as are indicated in the appended claims.

I claim:

1. An acrylic monomer having the general formula:

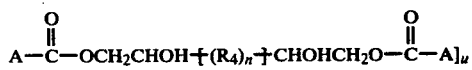

wherein A is

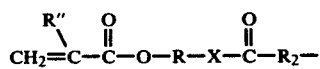

where R" is a member selected from the group consisting of hydrogen, chlorine, methyl and ethyl radicals, and where $R_2$ is an unsaturated divalent alkyl or substituted alkyl group of from 2-4 carbon atoms or an unsaturated divalent carbocyclic aliphatic ring of from 4-9 carbon atoms, and where X is a member selected from the group consisting of —O—, —NH—, and —NR'— where R' is a benzyl radical or an alkyl group of from 1-4 carbon atoms, and where R is

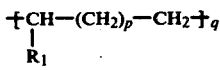

where p is an integer of from 0 to 2, q is an integer of from 1 to 3 $R_1$ is a member selected from the group consisting of hydrogen, methyl, ethyl, chloromethyl, methylol, phenyl, methoxyphenyl, methoxybutyl, methoxyallyl and

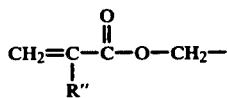

radicals where R" is as previously defined; wherein $R_4$ is a member selected from the group consisting of alkylidene oxy aryl, methylol alkoxy aryl, and alkoxy aryl sulfone; n is 0 or 1; and u is an integer of from 1 to 5.

2. An acrylic monomer having the general formula:

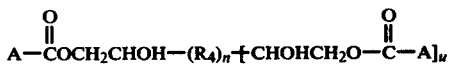

where A is

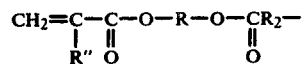

where R" is a member selected from the group consisting of hydrogen, chlorine, methyl and ethyl radicals, and where $R_2$ is an unsaturated divalent alkyl group of from 2-4 carbon atoms or an unsaturated divalent carbocyclic aliphatic ring of from 4-9 carbon atoms, and where R is

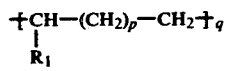

where p is an integer of from 0 to 2, q is an integer of from 1 to 3, $R_1$ is a member selected from the group consisting of hydrogen, methyl, ethyl, chloromethyl, methylol, phenyl and

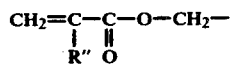

radicals where R" is as previously defined; wherein $R_4$ is alkylidene oxy aryl; n is 0 or 1; and u is an integer of from 1 to 5.

3. The acrylic monomer of claim 1 wherein n is 1, u is 1 and $R_4$ is the alkylidene oxy aryl radical

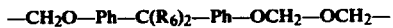

where Ph is phenyl and $R_6$ is a member selected from the group consisting of hydrogen, methyl, ethyl, propyl and butyl radicals.

4. The acrylic monomer of claim 2 in combination with an organic hydroperoxide catalyst, a quinone inhibitor, and a promoter selected from the group consisting of organic amines, imides, sulfimides, and mixtures thereof.

5. The acrylic monomer of claim 3 wherein R" is methyl, $R_2$ is —HC=CH—, R is —$CH_2CH_2$—, and $R_6$ is methyl.

6. The acrylic monomer of claim 4 blended with one or more polymerizable acrylic monomers selected from the group consisting of hydroxyethyl methacrylate, hydroxy propyl methacrylate, trimethylolpropane trimethacrylate, dibromo propyl methacrylate, diethylene glycol dimethacrylate, triethylene glycol dimethacrylate, dimethyl amino ethyl methacryate, tetraethylene glycol dimethacrylate, dipropylene glycol dimethacrylate, methyl methacrylate, ethyl methacrylate, propyl methacrylate, polyethylene glycol dimethacrylate, di-(pentamethylene glycol) dimethacrylate, n-butyl methacrylate, trimethylolpropane triacrylate, tetraethylene glycol diacrylate, isobutyl methacrylate, tetraethylene glycol di-(chloroacrylate), diglycerol diacrylate, diglycerol tetramethacrylate, butylene glycol dimethacrylate, ethylene glycol dimethacrylate, neopentyl glycol diacrylate, and tetrahydrofurfural methacrylate.

* * * * *